United States Patent [19]

Akagawa

[11] 4,034,867
[45] July 12, 1977

[54] HANDLING DEVICE
[75] Inventor: Minoru Akagawa, Funabashi, Japan
[73] Assignee: Kabushiki Kaisha Daini Seikosha, Japan
[21] Appl. No.: 634,524
[22] Filed: Nov. 24, 1975
[30] Foreign Application Priority Data
Nov. 26, 1974 Japan .................. 49-143206[U]
[51] Int. Cl.² .......................................... B25J 9/00
[52] U.S. Cl. ............................ 214/1 BB; 29/568; 92/165 PR; 214/1 BT
[58] Field of Search ............... 214/1 BB, 1.4, 1 BT, 214/1 BC, 1 BH, 141; 92/165 R, 165 PR; 29/568

[56] References Cited
U.S. PATENT DOCUMENTS

| 2,244,150 | 6/1941 | Greve | 92/165 R X |
| 2,330,006 | 9/1943 | Odenthal | 92/165 R X |
| 3,587,164 | 6/1971 | Davern | 29/568 |
| 3,935,950 | 2/1976 | Burch | 214/1 BB |

Primary Examiner—L. J. Paperner
Assistant Examiner—George F. Abraham

Attorney, Agent, or Firm—Robert E. Burns; Emmanuel J. Lobato; Bruce L. Adams

[57] ABSTRACT

A handling device including a head and a linear transfer arm mounted on the head and slideable along a major length dimension of the arm, and a piston and cylinder for driving the linear transfer arm. The cylinder is fixedly mounted on the head and includes a housing having a mjaor length dimension parallel to the transfer arm length dimension and extending from the head approximately a same length which the linear transfer arm extends from the head. The piston includes a piston rod connected to the linear transfer arm for driving the same when the piston is displaced within the cylinder. A bracket is fixedly secured to an end portion of the linear transfer arm and carries a pair of rollers disposed opposite each other above and below the cylinder and contacting the cylinder. The pair of rollers are mounted for rotation and rotate as the linear transfer arm is displaced along the major length dimension thereof and as the rollers travel along the length of the cylinder in contact therewith. The bracket and rollers engage the cylinder and prevent rotation of the linear transfer arm about its major length dimension.

5 Claims, 3 Drawing Figures

HANDLING DEVICE

BACKGROUND OF THE INVENTION

The invention relates to an improvement of a handling device having a linear transfer function, e.g., up-down or right left displacement.

Generally, handling devices of the linear displacement type have means for preventing rotation of a linear transfer arm. The linear transfer arm of such a conventional handling device is transferred along a guide shaft which is disposed in parallel with the arm so that rotation of the arm is prevented. In this case, there is a disadvantage in that the construction of the device is complicated.

SUMMARY OF THE INVENTION

It is an object of the invention to provide a handling device which is simple in construction and inexpensive to manufacture.

The handling device according to the invention includes a head and a linear transfer arm having a major length dimension, and slideably mounted on the head for sliding relative thereto. Driving means mounted on the head is operable for driving the linear transfer arm to slide along its major length dimension between a retracted position and an extended position extending from the head. The driving means comprises an elongated housing mounted on the head and having a major length dimension parallel to the transfer arm length dimension and having a length extending from the head approximately equal to a length of a portion of the linear transfer arm extending from the head when the linear transfer arm is in the retracted position. Means for preventing rotation of the linear transfer arm about the major longitudinal dimension thereof comprises a member fixedly secured to the linear transfer arm at an end portion thereof, and the member extends toward the housing of the driving means and freely engages therewith for permitting translational movement of the member relative to the housing along the major length dimension of the housing and for preventing rotational movement of the member relative to the housing thereby to prevent rotation of the linear transfer arm about the major longitudinal dimension thereof.

BRIEF DESCRIPTION OF THE DRAWINGS

The objects, features and advantages of the handling device according to the invention will be apparent from the specification and drawings in which.

DESCRIPTION OF THE PREFERRED EMBODIMENT

Figure 1:
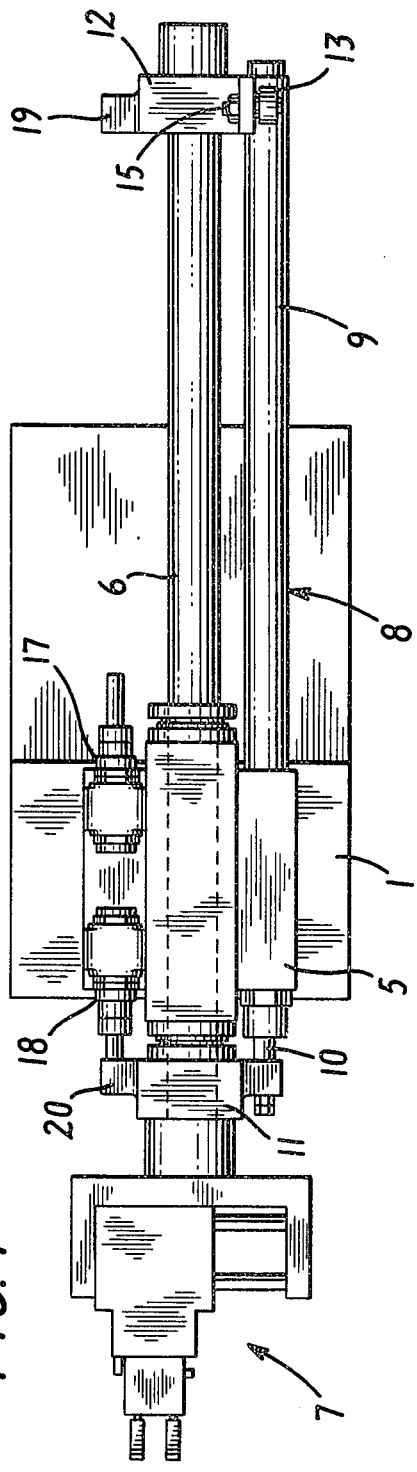
FIG. 1 is a plan view of the handling device according to the invention.
Figure 2:
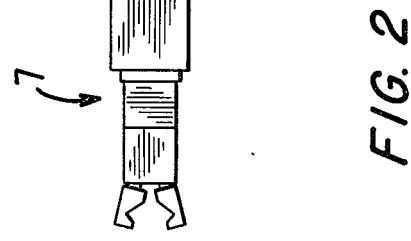
FIG. 2 is an elevational view of the handling device shown in FIG. 1.

The invention will be fully described with reference to a preferred embodiment shown in the drawings. In FIGS. 1 and 2, a vertical column 2 is connected with a piston rod 4 in a cylinder 3 which is provided in a base 1, and is vertically positionable according to the operation of the cylinder 3. A head 5 is attached on the top of the vertical column 2. The columns 2, cylinder 3 and piston rod 4 together comprise mounting and positioning means mounting the head on the base and operable for positioning the head along a certain direction relative to the base.

A horizontal arm 6 passes through the head 5 and is supported horizontally slidable by the head through linear motion ball bearings (not shown). On the front portion or first end portion of the horizontal arm 6, a manipulator 7 which has shifting, rotating and gripping function, is attached. A cylinder tube 9 of a cylinder 8 for driving the arm 6 is fixed to the head 5 in parallel with the arm 6. A reciprocative piston rod 10 in the cylinder tube 9 is connected with the front portion of the arm 6 through a connecting bracket 11, so that the arm 6 is horizontally transferred according to the operation of the cylinder 8.

Figure 3:
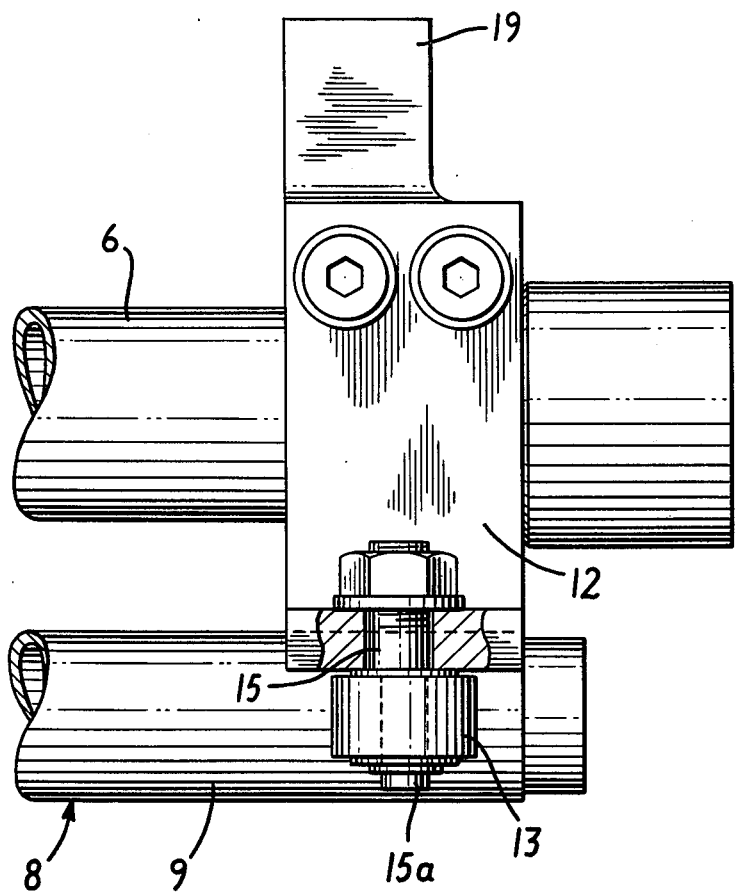
FIG. 3 is an enlarged partial plan view of the handling device, and partially broken away and showing structure for preventing rotation of a linear transfer arm of the handling device.

A holding bracket 12 is fixed to the back end portion or second end portion of the arm 6. An upper roller 13 and a lower roller 14 are rotatably supported on the bracket 12 through shafts 15 and 16 respectively so that the cylinder tube 9 is between the upper and lower rollers 13 and 14. One of the shafts, e. g., the shaft 15 of the roller 13, is provided with an eccentric portion 15a, as shown in FIG. 3. By rotating the shaft 15, an interval between the rollers 13 and 14 is adjusted so that both of the rollers 13 and 14 roll on the cylinder tube 9.

Stoppers or stops 17 and 18 for defining up the forward or backward end position of the arm 6 are mounted on the head 5. Each stopper, which has a damper function, stops the stopper block 19 of the bracket 12 or the stopper block 20 of the bracket 11, so that each stopper defines the forward or extended position and backward or retracted position of the arm 6. Magnetic contactless switches 21 and 22 are mounted on the head 5. The switch 21 is operated by a magnet 23 attached on the back end of the arm 6, when the arm 6 is on the forward end portion. The switch 22 is operated by a magnet 24 attached on the front portion of the arm 6, when the arm 6 is on the backward end position.

Next, the movement of the handling device will be described, in case of gipping and setting workpieces. In the state shown in FIGS. 1 and 2, the manipulator 7 is operated and grips a workpiece which is on the waiting position. And then the cylinder 3 is operated, so that the head 5 attached on the vertical column 2 is raised. The cylinder 8 is operated and the horizontal arm 6 is linearly transferred forward, i.e., to the left in FIGS. 1 and 2, through the action of piston rod 10. In this case, keeping in contact with the cylinder tube 9, the rollers 13 and 14 supported on the holding bracket 12, which is fixed to the back end portion of the arm 6, roll along the cylinder tube 9 and are transferred forward with the horizontal arm 6. The cylinder tube 9 is put between the upper roller 13 and the lower roller 14, so that it is possible to prevent rotation of the arm 6. When the arm 6 is transferred to the forward end position of the stroke, the stopper block 19 touches the stopper 17 and the speed of the arm 6 is reduced by damping action of the stopper 17, and the arm stops later. At this time, the magnet 23 gets near the magnetic contactless switch 21 and an end signal is generated. The signal operates the cylinder 3 so that the head 5 goes down, and the manipulator 7 sets the workpiece on a predetermined position. After such gripping and setting action is finished, the arm 6 is raised and transferred backward relative to the head 5, so that it returns to the retracted position shown in FIGS. 1 and 2.

Although the invention has been described in conjunction with a handling device containing a rotation preventing means for a horizontal arm which is horizontally transferred, it is to be understood that the invention is not limited to this and it is possible to apply the rotation preventing means to an arm which is vertically transferred.

As mentioned above, in the invention, since the cylinder driving the arm is disposed in parallel with said arm transferred linearly and the cylinder operates as a guide for preventing rotation of the arm, it is unnecessary to provide another guide, whereby the handling device according to the invention is simple in construction and inexpensive to manufacture. Moreover, the cylinder 8 does not carry the weight of the piece held by manipulator 7; this weight is carried entirely by the transfer arm 6.

In case the arm is supported by linear motion ball bearings and each stopper for setting up the forward or backward end position of the arm has a damper function, it is possible to transfer the arm at high speed.

I claim:

1. A handling device comprising: a base; a head; mounting and positioning means mounting said head on said base and operable for positioning said head along a certain direction relative to said base; a linear transfer arm having a major length dimension and a pair of opposed ends, and slideably mounted on said head for sliding relative to said head along the major length dimension from a retracted position with a first of said ends adjacent said head and the second of said ends remote from said head to an extended position with said first end remote from said head and said second end adjacent said head; said head comprising means slideably mounting said transfer arm thereon for sliding along the major length dimension between the retracted position and the extended position; driving means operable for driving said linear transfer arm to slide along the major length dimension between the retracted position and the extended position, said driving means comprising an elongated housing mounted on said head and having a major length dimension parallel to the transfer arm length dimension and having a length extending from said head approximately equal to a length of a portion of said linear transfer arm extending from said head when said linear transfer arm is in the retracted position, said head comprising means fixedly mounting said driving means thereon and to extend therefrom parallel to and in the same direction as said linear transfer arm when said linear transfer arm is in the retracted position; and means for preventing rotation of said linear transfer arm about the major longitudinal dimension thereof, said means for preventing rotation comprising a member fixedly secured to said linear transfer arm at an end portion thereof adjacent said second end, and said member extending toward the housing of said driving means and freely engaging therewith for permitting translational movement of said member relative to said housing along the major length of said housing and for preventing rotational movement of said member relative to said housing thereby to prevent rotation of said linear transfer arm about the major longitudinal dimension thereof.

2. A handling device according to claim 1, wherein said driving means comprises a cylinder tube comprising said housing, a piston disposed therein and having a piston rod extending axially from said cylinder tube, and means fixedly connecting a portion of said linear transfer arm adjacent said first end to said piston rod, whereby displacement of said piston with said cylinder tube displaces said cylinder rod thereby to displace said linear transfer arm along the major length dimension thereof.

3. A handling device according to claim 1, wherein the housing of said driving means comprises a cylinder tube, and wherein said means for preventing rotation of said linear transfer arm comprise a pair of rollers disposed opposite each other above and below said cylinder tube, a bracket fixedly secured to an end portion of said linear transfer arm adjacent said second end, and means mounting said pair of rollers on said bracket for rotation as said linear transfer arm is displaced along the major length dimension thereof and said rollers travel along the length of said cylinder tube in contact therewith.

4. A handling device according to claim 3, wherein said means mounting said pair of rollers on said bracket comprises a pair of shafts each mounting a respective one of said rollers, one of said shafts includng a first portion engaged by said bracket and a second portion eccentric to said first portion and defining an axel for the respective one of said rollers mounted thereon, whereby the position of the respective roller relative to said cylinder tube is adjustable by rotating the respective shaft mounting said roller.

5. A handling device according to claim 1, further comprising a manipulator mounted at said first end of said linear transfer arm.

* * * * *